US005821716A

United States Patent [19]

Okanik

[11] Patent Number: 5,821,716

[45] Date of Patent: Oct. 13, 1998

[54] METHOD OF CONTROLLING A TAP CHANGER OF A TRANSFORMER

[75] Inventor: Peter Okanik, Regenstauf, Germany

[73] Assignee: Maschinenfabrik Reinhausen GmbH, Regensburg, Germany

[21] Appl. No.: 688,061

[22] Filed: Jul. 29, 1996

[30] Foreign Application Priority Data

Aug. 5, 1995 [DE] Germany ........................ 195 28 827.0

[51] Int. Cl.[6] ........................ G05B 5/00

[52] U.S. Cl. ........................ 318/478; 364/483; 323/355; 323/260

[58] Field of Search ........................ 318/478; 364/483; 323/355, 260, 256, 247, 255

[56] References Cited

U.S. PATENT DOCUMENTS

| | | | |
|---|---|---|---|
| 3,725,771 | 4/1973 | Gilmore | 323/255 X |
| 4,916,377 | 4/1990 | Terada et al. | 323/247 X |
| 5,602,462 | 2/1997 | Stich et al. | 323/260 X |

*Primary Examiner*—Karen Masih
*Attorney, Agent, or Firm*—Herbert Dubno

[57] ABSTRACT

A tap-changer transformer operated by the step-by-step principle in which its motor drive receives a signal to raise or lower the tap, has a voltage regulator in which the switching delay times and sensitivity values are freed matrix-like the respective tap changes. The actual voltage value of the transformer is compared with the preselected voltage setpoint and, based upon the control deviation, a value pair of delay and sensitivity are read out. This allows asymmetric response of the system as contrasted with the symmetrical response required by earlier systems.

4 Claims, 4 Drawing Sheets

METHOD OF CONTROLLING A TAP CHANGER OF A TRANSFORMER

FIELD OF THE INVENTION

My present invention relates to a process for controlling a tap-changing transformer and, more particularly, to a method of controlling a motor-driven tap changer of a transformer, i.e. for the automatic control of transformers with motor-driven on-load tap changers.

BACKGROUND OF THE INVENTION

Motor-driven on-load tap changers for power distributing transformers utilizing a step by step principle wherein a single control pulse operates the tap changer from one service position to the next can be provided with a voltage regulator circuit which measures the actual voltage value and compares the measured actual voltage value with a predetermined voltage setpoint value for a particular tap; from this comparison, a control deviation is determined, frequently referred to as the measured voltage deviation. The latter can be used to generate a "raise" or "lower" control signal whenever the measured voltage deviation after a predetermined switching delay is greater than a predetermined sensitivity value, also referred to as the band width.

The system for performing such a process is described in the brochure issued by the assignee of this application and entitled "Microprocessor Controlled Voltage Regulating Relay MK 30 E," print number VK 35/91 en-1095/2000.

This earlier process and the apparatus described therein serves for the automatic control of transformers with tap changers actuated by a motor drive. The command for the motor drive in accordance with the step-by-step principle effects the voltage change of the transformer windings by one step for each "higher" ("riase") or "lower" command from the voltage regulator to the motor drive.

In this process and with the apparatus described in this publication, there are two different presettable switching time delays: the first delay time 1 effects a delay of the raise or lower control pulse from the voltage regulator when the deviation exceeds the setpoint width or sensitivity in either direction, the preliminary signal is not delayed. If the deviation falls below the setpoint width, the current delay time is cancelled. By setting of the delay time 1 to 0, the output pulse can be continuous. In other words, the first delay time results in a delay in the triggering by the voltage regulator of the motor drive whenever the control deviation exceeds the preset sensitivity in either direction. When the control deviation falls below the sensitivity value, the triggering is extinguished. In addition, with this earlier system, one can select an inverse time characteristic of the voltage regulator whereby the triggering delay is inversely proportional to the control deviation.

A second optionally settable switching delay 2 can effect a delay in the triggering after a lapse of the switching delay without effect, i.e. when more than one step must be made up by the tap change operation. This delays the "raise" or "lower" control pulse from the voltage regulator if the deviation still exists after the presetting tap change operation, i.e. if more than one tap change operation is necessary. With this process, the command to the motor drive by the regulator is only triggered when the sensitivity limit is exceeded by the control deviation in one direction or the other. The setting of the sensitivity must be matched to the relative step voltage of a load-switching operation.

While this system has been found to be highly effective in practice, a disadvantage has been discovered in that the measurement of the actual voltage is compared with the setpoint voltage and control is effected after a certain delay period so that only symmetrical control is possible. The presetting of the sensitivity of the control provides equal deviations of the actual voltage from the setpoint voltage above and below the setpoint voltage. The command from the voltage regulator is thus triggered independently of the sign of this control deviation and symmetrically regardless of whether the setpoint voltage is exceeded or the actual voltage falls below the setpoint voltage.

For many operators of stepped transformers and especially for many energy-supply applications, deviations of voltage upwardly require different responses from deviations of the voltage downwardly. For example, in many cases undervoltages are acceptable within a certain range, i.e. within a certain band width or sensitivity value, while corresponding overvoltages must be avoided because of the potential for overloading the network. There are in some cases, sanction payments may go into effect for even limited overvoltages while corresponding undervoltages can go ignored.

The different control requirements for overvoltages on the one hand and undervoltages on the other cannot be taken into consideration by known processes. While it is true that comparatively small overvoltages can be ignored by setting high sensitivity values and short delay times, there nevertheless is symmetry in the operation of such tap-changing transformers which causes excessive stepping operations and therefore reduces the useful life of the tap changer.

OBJECTS OF THE INVENTION

It is, therefore, the principal object of the present invention to provide a control process or method for tap changers which obviates the aforementioned drawbacks and allows different control responses dependent upon the sign of the control deviation.

It is an object of the invention, therefore, to provide a system which allows different response rules upon the drop of the actual voltage value below a voltage setpoint from those which govern the response to the rise of the actual voltage measurement above the setpoint.

SUMMARY OF THE INVENTION

These objects are achieved in accordance with the invention by providing for each value of the possible control deviations in a sign-correct manner treated as corresponding to n stages where n is a negative or positive integer with the total number of such integers representing the total number of taps of the transformer, an individual value for the sensitivity E(n) or band width and for the switching delay T(n), i.e. the first delay time. These values are stored in nonvolatile memory, preferably in a matrix pattern and as value pairs associated with the particular value of n and from memory the n corresponding to the actual deviation is determined and the values of E and T forming a value pair read from the memory and utilized to trigger the command signal after the lapse of that predetermined delay time. Control deviation exceeds the read-out sensitivity value E.

Alternatively, the control is effected when the control deviation during the predetermined part of the read-out delay time is greater than the predetermined sensitivity and then only when a command to the motor drive is issued.

The value pairs of the individual sensitivity value E(n) and the switching delay value T(n) for each positive and negative value n corresponding to a respective voltage tap of the transformer are stored in the nonvolatile memory in a matrix form.

The main advantage of the invention is that it allows separately for positive and negative control deviations, different switching delay times and different sensitivities or band widths of the voltage regulator to be provided by reading them from the nonvolatile storage depending upon the size of the control deviation and its magnitude related to the number of voltage steps, the particular switching delay and sensitivity values being read from the entire constellation of such values and utilized for the control purposes.

It is therefore possible to control differently with positive control deviations from the control effected with negative control deviations. It is also possible to control differently for one voltage step than with another having, for example, a much greater absolute control deviation encompassing two or three voltage taps. The reference to different control deviation as contained herein applies not only to the sensitivity of the voltage regulator, i.e. the threshold value at which a command is given to the tap changer, but also to the switching delay, the time to the issuance of the command so that it also may have different values for different taps and different control deviations. The control characteristics can thus satisfy the individual needs of power suppliers and plant operators and can satisfy control criteria and economic factors to allow more precise control and significantly longer operating times of the control system.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
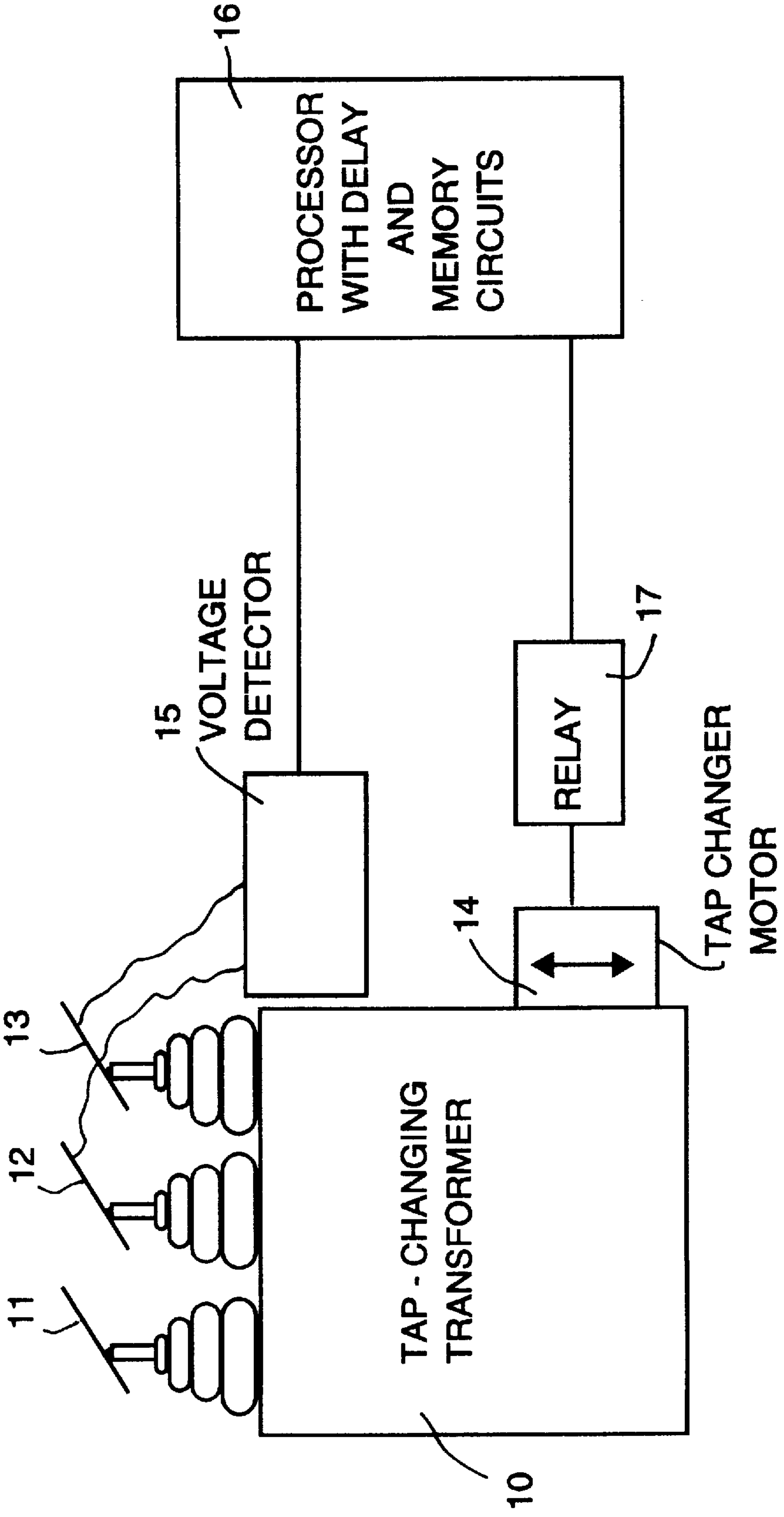
FIG. 4 is a diagram showing in general form the system of the invention connected to a tap-changer motor.

Referring first to FIG. 4, it can be seen that the basic apparatus of the invention includes a tap-changing transformer 10 which can be connected to supply the power lines 11, 12, 13 of a system with a voltage which depends upon the selected transformer tap, the tap changing being effected by a tap-changing motor 14 and a respective drive.

A voltage detector 15 sends the output voltage of the tap-changing transformer and provides an input to a processor having delay and memory circuits as represented at 16 which, in turn, can operate a relay 17 to provide a single pulse each of which effect changing of a tap upwardly or downwardly, i.e. in the plus or in the minus direction as has been described previously.

The voltage detector and relay system may form part of a voltage regulator, along with the processor circuitry 16 as has been described in the prior publication.

Figure 1:
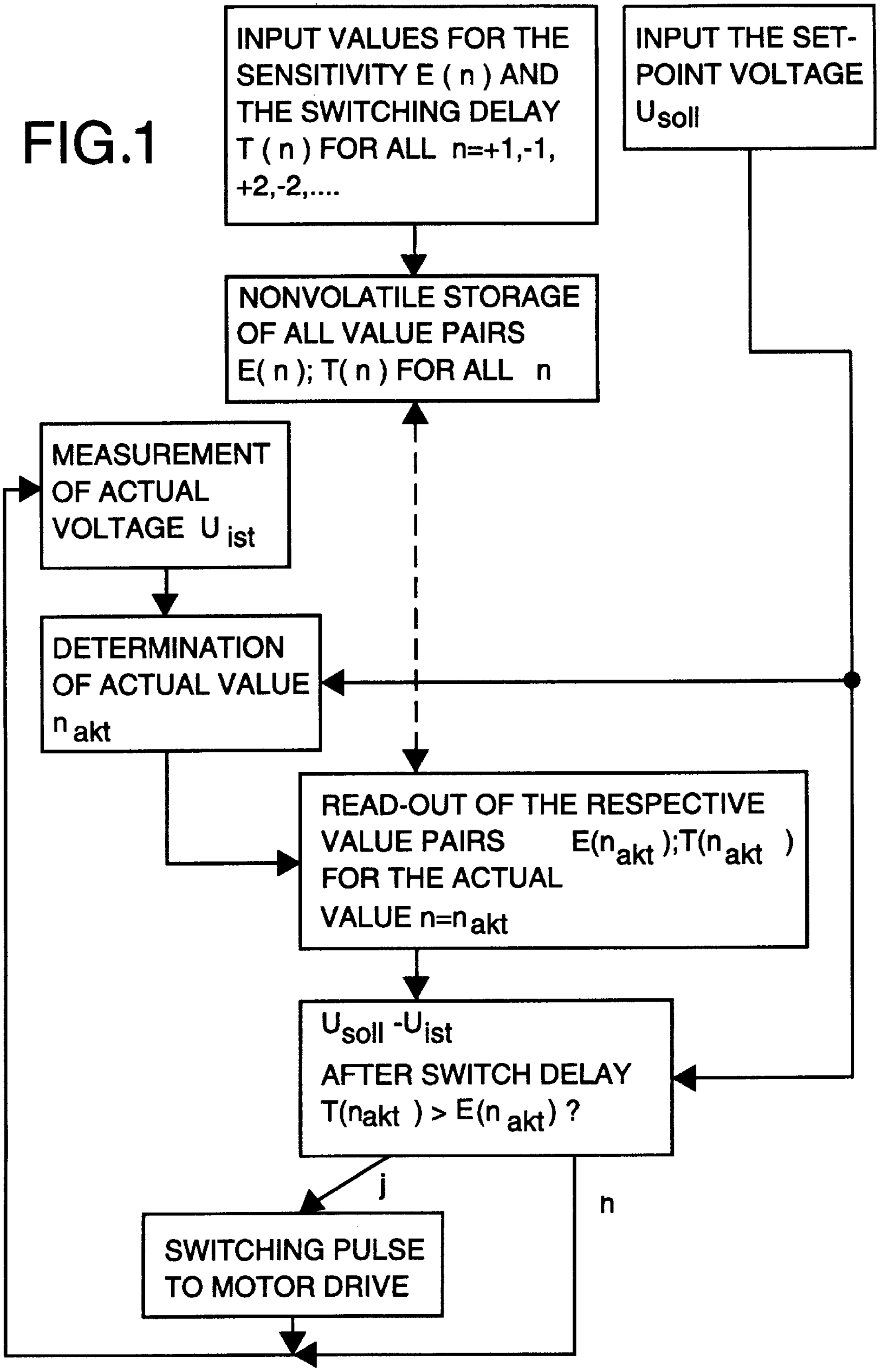
FIG. 1 is an information flow diagram illustrating the process in which the system responds when the control deviation exits the sensitivity in a general sense.

With the system of the invention, however, and as illustrated in FIG. 1, initially in the nonvolatile memory of the voltage regulator, i.e. in the processor system 16 of FIG. 4, independent values for the switching delay T and the sensitivity E are stored in a matrix pattern both for positive and negative control deviations and different absolute magnitudes of the control deviation with reference to the number n of the voltage step. If all values are part of the matrix, they are stored in the following matrix pattern.

| | Absolute Value of the Control Deviation. Referred to the Number n of the Voltage Tap | Switching Delay T | Sensitivity E |
|---|---|---|---|
| 1. | >+1 | T (n = +1) | E (n = +1) |
| 2. | >−1 | T (n = −1) | E (n = −1) |
| 3. | >+2 | T (n = +2) | E (n = +2) |
| 4. | >−2 | T (n = −2) | E (n = −2) |
| 5. | >+3 | T (n = +3) | E (n = +3) |
| 6. | >−3 | T (n = −3) | E (n = −3) |

In practice in all cases it is sufficient to provide magnitudes of the control deviation which span a maximum of three voltage steps. As a limiting value for the voltage step the value "unending" is possible as for the case $n=\pm1$, the value 0 can be encompassed. In the first case there is no control, i.e. the control deviation is ignored in the second case there is an immediate energization of the motor drive.

In a conventional manner, for example by means of a voltage converter, the actual value of the voltage to be controlled is measured as compared in a comparator unit with a predetermined setpoint of the control voltage and from the comparison the control deviation is obtained. From the latter the sign plus or minus of the control deviation and the absolute magnitude of the control deviation, given as the number n of voltage steps required to correct it, are obtained. From the first stored value pairs of the matrix for the switching delay T(n) and sensitivity E(n) for each occurring value pair $T(n_{akt})$ and $E(n_{akt})$ for the actual value $n=n(n_{akt})$, are read out from memory and supplied to the controller as the respective control points determining whether a switching command should be given to the motor drive and when.

Suitable values for T(n) range up to 30 minutes and suitable values for the sensitivity E(n) range from 0.5 to 9% of the respective base value.

It is naturally also possible, and in many cases sensible to not fill all fields of the illustrated matrix with different parameters. For example, for all control deviations greater than ±1, the same delay time may be used. It is also sensible to limit the asymmetric control to certain selected regions. However what is important is that the described matrix-like storage and arrangement of discrete switching delays and sensitivity values for each sign and magnitude of different control deviations allows a multiplicity of individual control criteria to apply over the entire control range.

For carrying out the process of the invention in an electronic voltage regulator it is in many cases desirable to provide certain fixed values which the user can select for all values of n for storage in corresponding value pairs.

For a switching delay T(n), in an example, the values T1, T2, T3 are "unending" are optionally given where T1 . . . T3 describe different times and "unending" signifies that no switching is to be undertaken. The sensitivity values 0.5 . . . 9% can be provided in steps of 0.1%.

Figure 2:
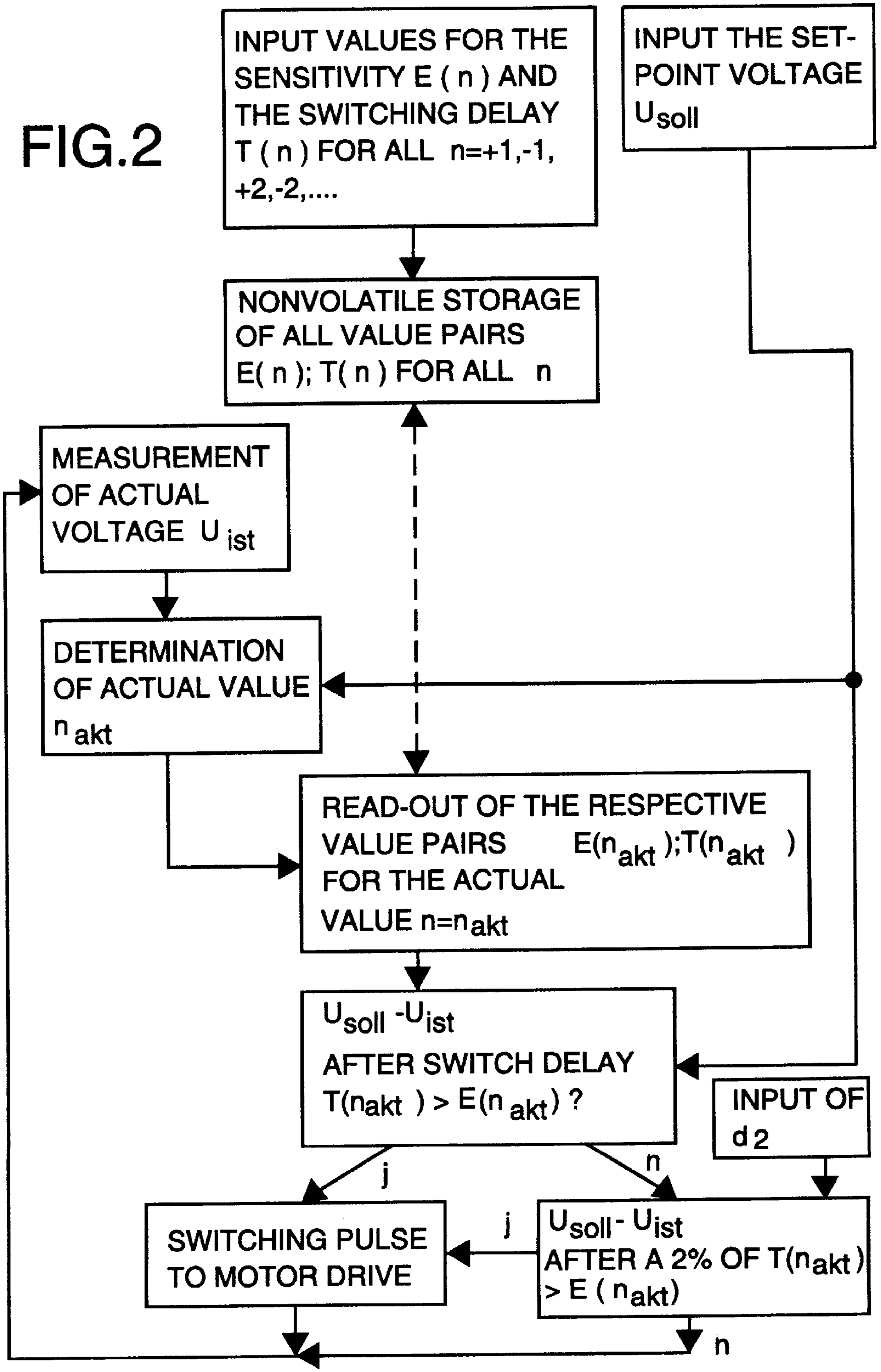
FIG. 2 is a diagram of the process when the control deviation exits the sensitivity for a predetermined portion of the switching delay.
Figure 3:
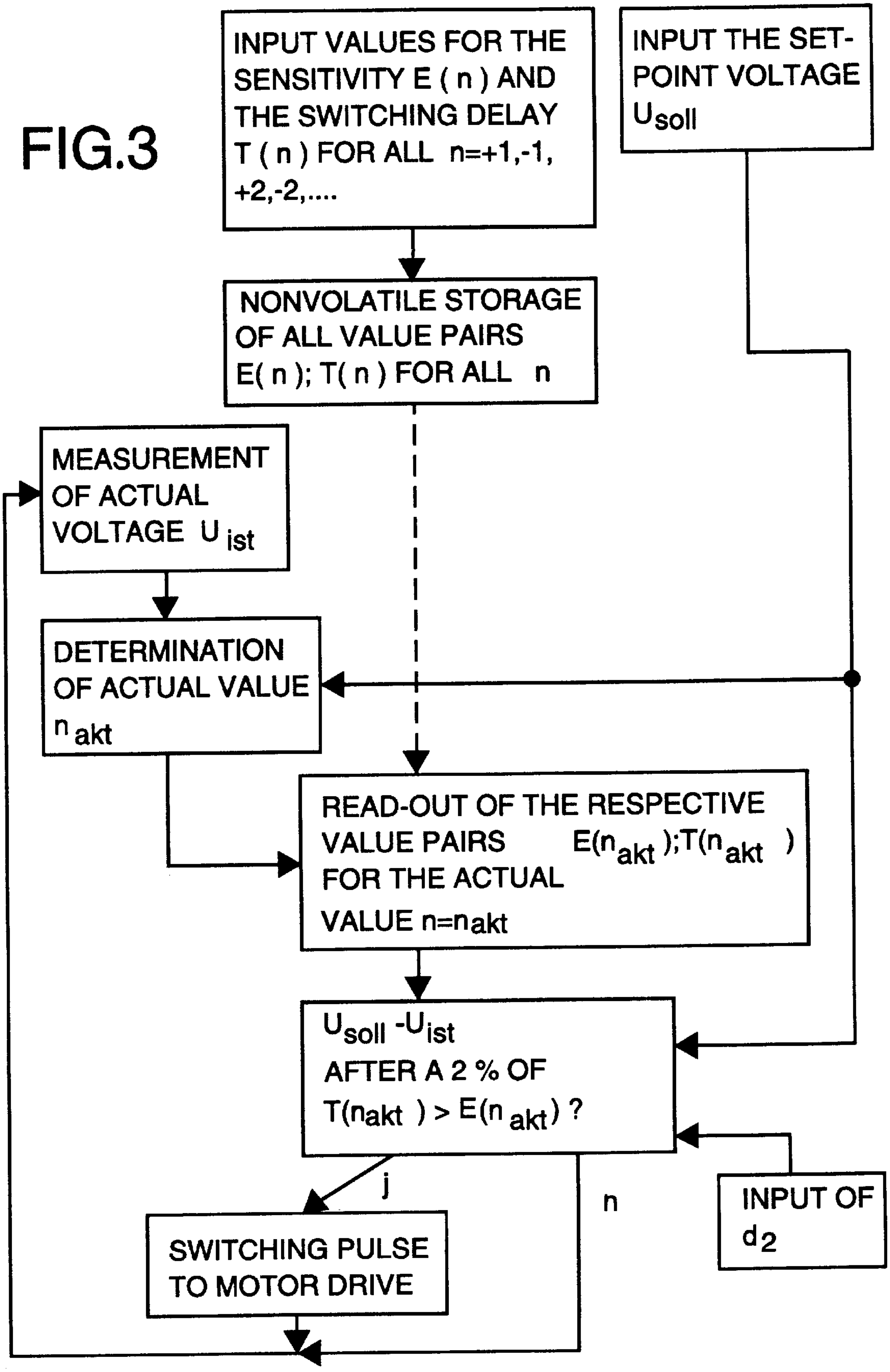
FIG. 3 is an information flow diagram of the process as applied to a system which allows further optimization over that of FIG. 2.

FIGS. 2 and 3 show embodiments of the process of the invention with more optimal control behavior and enabling better individual matching of the system to the requirements of respective users.

As has been described with respect to the state of the art, in the prior art process when there is a drop of the control deviation below the sensitivity limit within the predetermined time delay, no control occurs. It can also happen that the actual voltage value during a time period which is only slightly shorter than the triggering delay is substantially higher than the setpoint voltage without triggering a control operation.

To overcome this disadvantage, in the processes illustrated in FIGS. 2 and 3, the tendency of the actual voltage is determined. This means that one determines the percentage or fraction a1 of the delay period T(n) within which the actual value of the voltage oversteps or understeps the setpoint voltage by an amount corresponding to the sensitivity value or limit. In stead of the delay time, some other time interval can be selected for this purpose. The determination can be carried out by a time measurement or also by means of integration. The determined fraction a1 is compared with a predetermined fraction a2 which can be for example 60 . . . 90%. Should a1 be greater than a2, signifying a tendency of the voltage change which is greater than a threshold limit, control is carried out, i.e. the voltage regulator sends a corresponding signal to the motor drive.

The process of the present invention can be carried out with a microprocessor controlled voltage regulator of the type described in the aforementioned publication with appropriate programming in accordance with the information diagrams of FIGS. 1–3. The nonvolatile storage of the values and setpoint values, the comparison of the respective actual values and setpoint values and the reading of the relevant parameters all can be effected via the CPU. The measurement of the voltage can be carried out with a voltage converter having an analog/digital converter connected thereto. The output motor drive can be effected by the relay as has been described.

I claim:

1. A method of controlling a tap changer of a transformer having a motor drive for effecting tap changing, said method comprising the steps of:

(a) storing in nonvolatile memory in value pairs an individual sensitivity value E(n) and a switching delay value T(n) for each positive and negative value n corresponding to a respective voltage tap of the transformer, wherein n can assume a value . . . , −3, −2, −1, +1, +2, +3, . . . , ;

(b) measuring an actual voltage value of said transformer and comparing the measured actual voltage value with a preselected voltage setpoint;

(c) generating a control deviation $n_{akt}$ from the comparison of the measured actual voltage value with said preselected voltage setpoint and with a sign representing direction of deviation of the measured actual voltage value from said preselected voltage setpoint;

(d) reading out of said nonvolatile memory a value pair of a sensitivity value $E(n_{akt})$ and a switching delay value $T(n_{akt})$ for $n=n_{akt}$; and (e) issuing an actuating command to said motor drive when, after a switching delay of said switching delay value $T(n_{akt})$, the control deviation exceeds said sensitivity value $E(n_{akt})$.

2. The method defined in claim 1 comprising the step of storing said value pairs of an individual sensitivity value E(n) and a switching delay value T(n) for each positive and negative value n corresponding to a respective voltage tap of the transformer in said nonvolatile memory in a matrix form.

3. A method of controlling a tap changer of a transformer having a motor drive for effecting tap changing, said method comprising the steps of:

(a) storing in nonvolatile memory in value pairs an individual sensitivity value E(n) and a switching delay value T(n) for each positive and negative value n corresponding to a respective voltage tap of the transformer, wherein n can assume a value . . . , −3, −2, −1, +1, +2, +3, . . . , ;

(b) measuring an actual voltage value of said transformer and comparing the measured actual voltage value with a preselected voltage setpoint;

(c) generating a control deviation $n_{akt}$ from the comparison of the measured actual voltage value with said preselected voltage setpoint and with a sign representing direction of deviation of the measured actual voltage value from said preselected voltage setpoint;

(d) reading out of said nonvolatile memory a value pair of a sensitivity value $E(n_{akt})$ and a switching delay value $T(n_{akt})$ for $n=n_{akt}$;

(e) determining if the control deviation during a preselected fraction a2 of a switching delay period corresponding to said switching delay value $T(n_{akt})$ exceeds said sensitivity value $E(n_{akt})$; and (f) issuing an actuating command to said motor drive when the control deviation exceeds said sensitivity value $E(n_{akt})$ during said preselected fraction a2 of said switching delay period.

4. The method defined in claim 3 comprising the step of storing said value pairs of an individual sensitivity value E(n) and a switching delay value T(n) for each positive and negative value n corresponding to a respective voltage tap of the transformer in said nonvolatile memory in a matrix form.

* * * * *